United States Patent Office 3,303,595
Patented Feb. 14, 1967

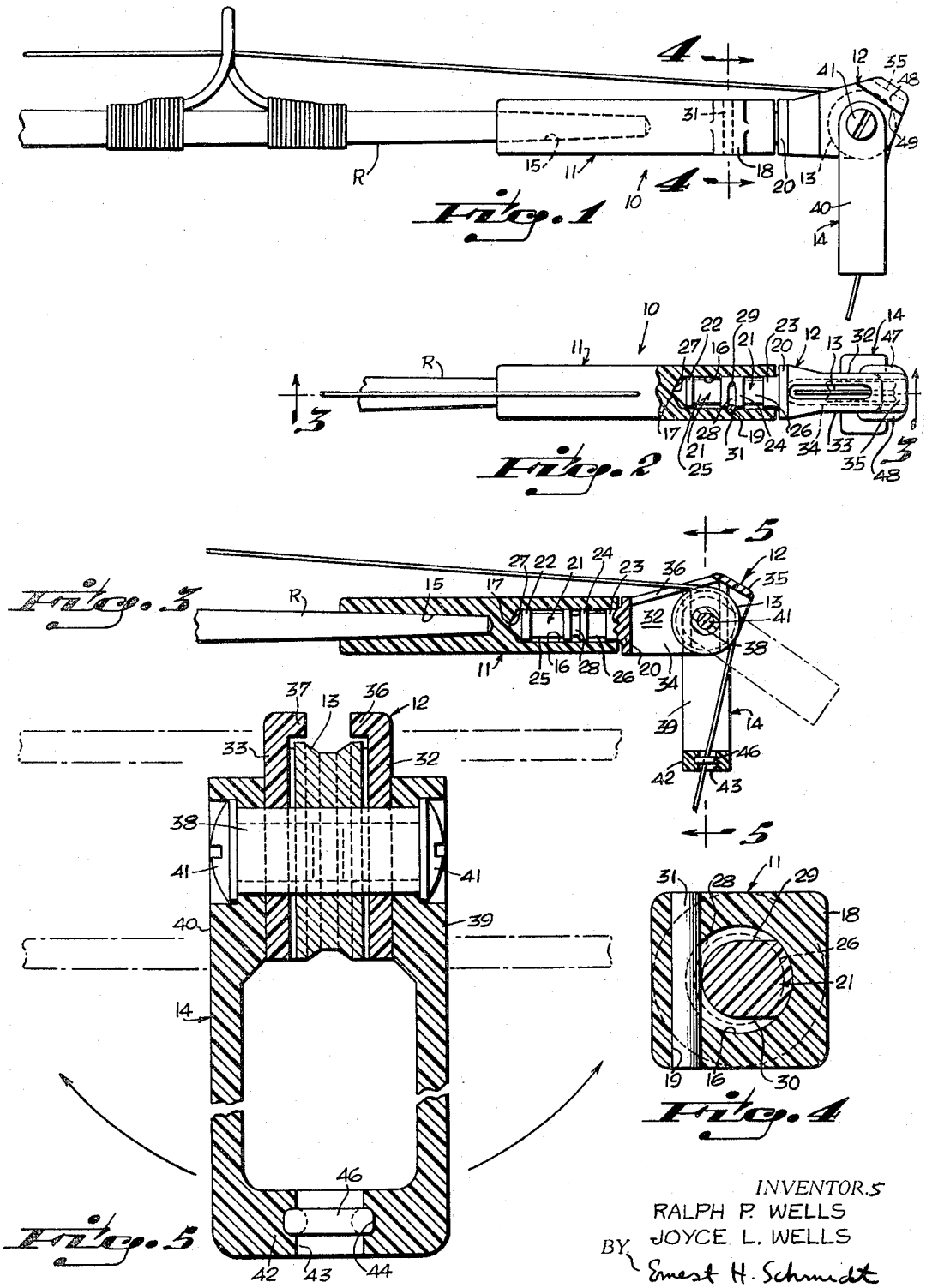

3,303,595
SWIVEL ACTION PULLEY TIP FOR FISHING RODS
Ralph P. Wells and Joyce L. Wells, Miami, Fla., assignors to Wells Engineering & Research, Inc., a corporation of Florida
Filed Feb. 15, 1965, Ser. No. 432,638
8 Claims. (Cl. 43—24)

This invention relates to sport fishing and is directed particularly to improvements in swivel action pulley tips for fishing rods.

In sport fishing, particularly in deep sea fishing, the forces encountered on rod and line when playing a large hooked fish necessitate free action of the line over the tip of the rod as it is being payed out or reeled in, if line or rod breakage is to be avoided or minimized, especially if a fish exceeding the strength limits of rod and or line is hooked. Various swivel action pulley tips for fishing rods designed to minimize line friction have heretofore been devised. Such tips as have been patented or marketed, however, have not achieved wide acceptance and use by fishing sportsmen for one or more of the reasons that they were too expensive, too bulky, subject to corrosion and binding at the pulley sheave, and subject to binding or entangling between the pulley sheave and its journalling support.

It is accordingly the principal object of this invention to provide a swivel action pulley tip for fishing rods that obviates the deficiencies of such tips as have heretofore been devised or marketed.

A more particular object is to provide a tip of the character described that is inconspicuous in size and light in weight so as to be especially suitable for use with light tackle, inexpensive to manufacture and assemble to a rod, self-cleaning and self-lubricating in its swivel and pulley action, trouble-free and long wearing in use, and neat and attractive in appearance.

Other objects, features and advantages of the invention will be apparent from the following description when read with reference to the accompanying drawings. In the drawings, wherein like reference numerals denote corresponding parts throughout the several views:

FIG. 1 is a side view of the end portion of a fishing rod embodying the invention assembled to the tip end;

FIG. 2 is a top view of the pulley tip shown in FIG. 1, with a portion broken away to show internal construction;

FIG. 3 is a vertical cross-sectional view thereof taken along the line 3—3 of FIG. 2 in the direction of the arrows;

FIG. 4 is a vertical cross-section taken along the line 4—4 of FIG. 1 in the direction of the arrows and on an enlarged scale, illustrating details of the swivel limit mechanism; and FIG. 5 is a vertical cross-section, taken along the line 5—5 of FIG. 3 in the direction of the arrows and on an elongated scale, illustrating details of the pulley mechanism and yoke.

Referring now in detail to the drawings, 10 in FIGS. 1 and 2 designates a swivel action pulley tip embodying the invention, the same being comprised, generally, of a sleeve member 11, a pulley housing 12, a pulley or sheave 13 and a yoke 14.

The sleeve member 11, which is preferably molded of a tough synthetic plastic such as "Delrin," a product of E. I. du Pont de Nemours and Co. of Wilmington, Delaware, is generally cylindrical in form, and provided with a tapered axial bore 15 at one end for assembly to the tip of a glass fishing rod, and a comparatively short cylindrical bore 16 at the other end for receiving, in swiveling connection, the shank of the pulley housing 12 as is hereinafter described. The bottom of the bore 16 is slightly concavely rounded, as indicated at 17. As illustrated in FIGS. 1 and 4, the sleeve member 11 has a short section 18 of square cross-sectional shape near the pulley housing end, and said short section is provided with a vertical bore 19 at one side so located as to extend by a distance of about one-half its diameter, into the longitudinal cylindrical bore 16.

The pulley housing 12, which is also molded of a tough synthetic plastic such as "Delrin," is formed with a central body portion 20 of cylindrical shape and of a diameter at its inner end substantially equal to that of the sleeve member 11. Integrally formed with the inner end of the body portion 20 is an axially-extending shank portion 21 of decreased diameter having outer and inner end portions 22 and 23, respectively, and a central portion 24 all of which are of such diameter as to afford a sliding fit within the sleeve bore 16, and which define, therebetween, reduced diameter portions 25 and 26 providing annular spaces between said shank portion and said bore. The tip end of the shank portion 21 is rounded, as indicated at 27, the radius of curvature being slightly less than that of the concavely rounded bore bottom 17 of the sleeve member 11. As illustrated in FIG. 3, the shank portion of the pulley housing 12 is of such length as to fit within the sleeve member bore 16 with contact of the rounded tip 27 at the bore bottom 17 while the central body portion 20 is slightly spaced from the outer end of said sleeve member.

Means is provided for holding the pulley housing 12 axially in place with respect to the sleeve member 11 and for constraining it to limited rotary movement therein. To this end, the central portion 24 of the shank portion 21 is formed with a peripheral recess 28 of semicircular cross-sectional shape and of a diameter substantially equal to that of the bore 19 in the sleeve member 11 and in register therewith (see FIGS. 2 and 4). As best illustrated in FIG. 4, the recess 28 extends a full 180 circular degrees about the shank portion 21 and opens outwardly at each end along parallel end seat portions 29, 30. A roll pin 31 fitted through the bore 19 and extending into the recess 28 thus prevents axial movement of the pulley housing 12 with respect to the sleeve member 11. Also, the limited extent o fthe recess 28 limits rotary movement of the pulley housing 12 to 180 circular degrees, i.e., 90 circular degrees to either side while the rod is held in normal or fishing position, as illustrated by the broken-line representation of such positional movement in FIG. 5.

The outer end of the pulley housing 12 is bifurcated to provide opposed, spaced, side wall portions 32, 33 defining a central axially-extending slot 34. Top portions of the side wall portions 32, 33 near the outer ends thereof, are bridged with an integral web portion 35. Marginal portions of the wall portions 32, 33 defining, with the web portion 35, the top opening of the pulley housing through which the rod line passes, are formed with inwardly-directed lips 36, 37 closely overlying peripheral end portions of the sheave journalled between said wall portions by a transverse journal pin 38. The sheave 13 and journal pin 38 are also preferably of a tough synthetic plastic material such as "Delrin." The journal pin 38 projects outwardly of the side wall portions 32, 33 to journal thereon, for swinging action with respect to the pulley housing 12, the opposed leg portions 39, 40 of the U-shaped yoke 14, said yoke also preferably being integrally molded of a tough synthetic plastic material such as "Delrin." The ends of the journal pin 38 are axially drilled and tapped to receive pin head machine screws 41 securing the assembly in place, said pin being long enough to afford enough spacing between the yoke leg portions 39, 40 and the side wall portions 32, 33 to allow free swinging of said yoke with respect to the pulley housing 12. The web portion 42 of the yoke 14 is formed with a central opening 43 having an annular interior recess 44 within which is seated a hard guide ring 46 such as of carballoy or a comparable material, through which the rod line passes. Lateral projections 47 and 48 formed at the outsides of the side wall portions 32, 33 of the pulley housing 12 provide outwardly and downwardly inclined abutment shoulders 49 (only one shown in FIG. 1) limiting the upward swinging movement of the yoke 14 to a position about 45 degrees down from the horizontal as represented by the broken-line position thereof in FIG. 3.

FIGS. 1, 2 and 3 illustrate the use of our swivel-action pulley tip on a typical light-weight rod R. The limited rotary movement of the pulley housing 12, and limited swinging movement of the yoke 14, as described above, prevent any possibility of the line becoming tangled or snagged no matter how actively a game fish is being played. The free movement afforded by the swivel action tip in conjunction with the fact that the line is controlled by its passing through the central guide ring so that in normal fishing, whether the yoke swings to the right or to the left to its full extent, the line is always in the pulley groove with the pulley continuing to rotate, eliminating frictional damage that could otherwise be caused by the line leaving the pulley and passing over any other part of the pulley housing mechanism.

Another advantage of our invention resides in the fact that the inclined abutment shoulders 47 and 48, in instances when the rod is unattended and rolls over due to the weight of the reel, prevents the yoke from swinging over the top of the pulley housing to keep the line in engagement with the pulley, and out of frictional contact with web portion 35 or any other part of the pulley housing. In this limit position of the yoke when the rod is in the reverse position, pulling upon the line will, by caster action, cause the pulley housing to turn into the direction of pull, again eliminating any possibility of the line leaving the pulley and rubbing over any part of the pulley housing, and causing undue stress to the yoke itself.

While we have illustrated and described herein only one form in which our invention can conveniently be embodied in practice, it is to be understood that this form is presented by way of example only, and not in a limiting sense. The invention, in brief, is to be limited only by the scope and spirit of the following claims.

What we claim as new and desire to secure by Letters Patent is:

1. A swivel action pulley tip for fishing rods comprising, in combination, an elongated sleeve member, a pulley housing member, said sleeve member having an axial opening in one end for receiving in interfitting engagement the tip end of a fishing rod, and a coaxial cylindrical opening in the other end, said pulley housing member having at one end an integral cylindrical shank portion journalled within said cylindrical opening, means for limiting the rotational motion of said pulley housing member to less than a full turn with respect to said sleeve member, said pulley housing member having integrally formed at the other end a pair of spaced parallel walls defining therebetween a longitudinally-extending slot the plane of symmetry of which includes the longitudinal axis of said shank portion, a pulley wheel in said slot, means journalling said pulley wheel with respect to said walls, a U-shaped yoke having spaced parallel leg portions the outer ends of which straddle outer surface portions of said walls, means for journalling said outer ends of said leg portions about an axis common with the axis of rotation of said pulley wheel for swinging motion with respect to said pulley wheel, said yoke having a web portion, said web portion having a central line guide opening, and means limiting the swinging motion of said yoke with respect to said pulley wheel.

2. A swivel action pulley tip for fishing rods as defined in claim 1 wherein said pulley housing member rotational motion limiting means comprises a peripheral recess of semi-circular cross-sectional shape provided in said shank portion of said housing member extending only partially around said shank portion, a transverse bore in said sleeve member intersecting said semi-circular recess, and a cylindrical pin received within said bore and said recess.

3. A swivel action pulley tip for fishing rods as defined in claim 2 wherein said sleeve member is generally of cylindrical external shape, the zone thereof through which said transverse bore extends being of square cross-sectional shape for increased strength.

4. A swivel action pulley tip for fishing rods as defined in claim 3 wherein said sleeve member, said pulley housing member, said pulley wheel and said yoke are all molded of a tough synthetic plastic material.

5. A swivel action pulley tip for fishing rods as defined in claim 1 wherein the spaced parallel walls of said housing member are formed with opposed, inwardly-directed lips overlying peripheral edge portions of said pulley wheel.

6. A swivel action pulley tip for fishing rods as defined in claim 3 wherein the outer end of said shank portion is convexly rounded, and wherein the inner end of the cylindrical opening in said sleeve member is concavely rounded with a radius of curvature slightly greater than that of said outer end of said shank portion.

7. A swivel action pulley tip for fishing rods as defined in claim 6 wherein said peripheral recess is spaced approximately centrally along said shank portion, and including annular recesses at each side thereof for minimizing frictional contact of said shank member in its turning movement.

8. A swivel action pulley tip for fishing rods as defined in claim 6 including a housing web portion integrally formed with and bridging outer end portions of said spaced parallel walls of said housing member, said yoke swinging motion limiting means comprising abutment protrusions integrally formed in outer wall portions of said parallel walls, said protrusions providing inclined shoulders in the swinging paths of said yoke leg portions operative to prevent said yoke from swinging over said housing web portion.

References Cited by the Examiner
UNITED STATES PATENTS

| | | | |
|---|---|---|---|
| 2,324,353 | 7/1943 | Berry | 43—24 |
| 2,652,654 | 9/1953 | Bahn | 43—24 |
| 3,034,248 | 5/1962 | Williams | 43—24 |

SAMUEL KOREN, *Primary Examiner.*

D. J. LEACH, *Assistant Examiner.*